United States Patent [19]

Breunig et al.

[11] Patent Number: 5,125,781
[45] Date of Patent: Jun. 30, 1992

[54] AIR LOCK FOR TRANSFER OF PRODUCT INTO AND OUT OF VACUUM OR PRESSURIZED CHAMBER

[75] Inventors: Tim A. Breunig, Grapevine, Tex.; Gary A. Anders, Hutchinson; Robert D. Lee, Nickerson, both of Kans.

[73] Assignee: Recot, Inc., Dallas, Tex.

[21] Appl. No.: 469,866

[22] Filed: Jan. 24, 1990

[51] Int. Cl.⁵ .............................................. B65G 67/00
[52] U.S. Cl. ..................... 414/217; 222/361; 222/365
[58] Field of Search ............ 220/330, 361, 365; 414/220, 217

[56] References Cited

U.S. PATENT DOCUMENTS

| | | |
|---|---|---|
| 780,680 | 1/1905 | Peterson et al. . |
| 3,058,625 | 10/1962 | Greaves ............... 222/361 X |
| 3,474,247 | 10/1969 | Stocklein . |
| 3,587,879 | 11/1969 | Guernet . |
| 3,633,770 | 1/1972 | Howard ............... 414/220 |
| 3,817,084 | 6/1974 | Whitehead . |
| 3,995,777 | 12/1976 | Diez et al. . |
| 4,127,151 | 11/1978 | Ueda et al. . |
| 4,140,228 | 2/1979 | Hathaway et al. . |
| 4,149,658 | 4/1979 | Teufel ............... 222/361 X |
| 4,150,759 | 4/1979 | Bell, Jr. . |
| 4,321,115 | 3/1982 | Rebmann et al. ............... 222/365 X |
| 4,504,194 | 3/1985 | Holden . |
| 4,635,829 | 1/1987 | Brittingham, Jr. ............... 222/361 X |
| 4,687,408 | 8/1987 | Klambauer . |
| 4,733,803 | 3/1988 | Sisson et al. ............... 222/361 X |
| 4,826,698 | 5/1989 | Reznik . |

FOREIGN PATENT DOCUMENTS 52-264757 5/1977 Japan .
58-172126 8/1983 Japan .

Primary Examiner—Gregory L. Huson
Attorney, Agent, or Firm—Rothwell, Figg, Ernst & Kurz

[57] ABSTRACT

An air lock transfer device allows the transfer of substances between environments at different pressures, without disrupting the integrity of the pressure differential therebetween and which allows for a near continuous product flow between environments. The device comprises a housing and a transfer mechanism reciprocating within the housing such that at least two product chambers within the transfer mechanism simultaneously communicate with an outlet port and one of at least two inlet ports contained in the housing to allow product to be simultaneously loaded and discharged from the housing.

8 Claims, 7 Drawing Sheets

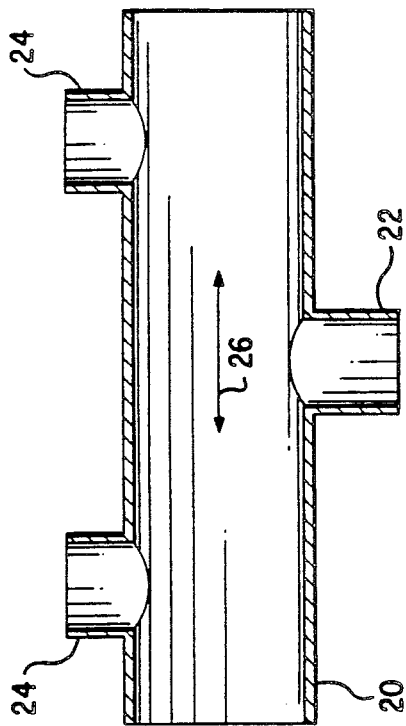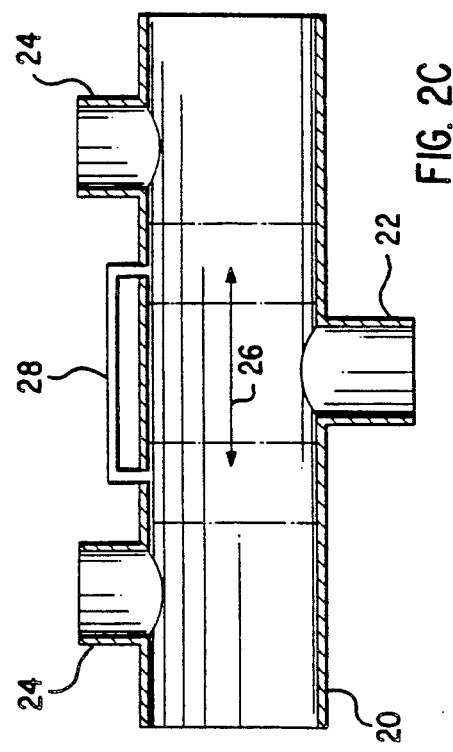

AIR LOCK FOR TRANSFER OF PRODUCT INTO AND OUT OF VACUUM OR PRESSURIZED CHAMBER

BACKGROUND OF THE INVENTION

1. Field of the Invention

The present invention relates to mechanisms for transferring materials between environments of different pressures, without disrupting the pressure differential therebetween.

In particular, the present invention relates to apparatus for facilitating the processing of food or other substances in positive or negative pressure environments.

2. Prior Art

Known in the art are complex valve mechanisms for transferring solid abrasive or corrosive materials from one location to another. In particular, U.S. Pat. No. 3,995,777 to Diez et al. discloses a gatling-type valve having clustered chambers rotatable about a common axle within a container. The chambers are attached to gatling plates which are rotated by activating a motor attached to the common axle.

In addition, U.S. Pat. No. 4,150,759 to Bell, Jr. discloses an apparatus for feeding coal to a high pressure gasifier which requires the use of a plurality of fluid-actuating means to bias or translate the motion of first and second pistons mounted on a shaft as well as the motion of a floating piston between the first and second pistons.

A need in the art exists to allow the transfer of food solids or liquids between pressurized or vacuum environments and an environment at atmospheric conditions without disruption of the processing conditions and in a manner approaching a continuous feed to meet production schedule demands. For example, in the use of certain vacuum fryers or pressurized microwave ovens, food substances must be delivered into and discharged from the processing environments without destroying the pressure integrity of the environment and as quickly and continuously as possible to maintain an efficient product yield.

SUMMARY OF THE INVENTION

The present invention eliminates the need for cumbersome lock mechanisms to maintain differential pressure integrity between the atmosphere and a closed chamber.

The present invention provides a device for allowing the loading and discharge of food substances and other materials to a positive or negative pressure vessel and which exhibits a substantially continuous product flow.

The present invention further provides a device for transferring food substances between atmospheric conditions and positive or negative pressure environments while maintaining the integrity and cleanliness of the food substance.

The present invention further provides apparatus for transferring material between two different pressure environments, comprising an elongated housing having at least two inlet ports spaced apart from each other in communication with an environment at one pressure, and at least one outlet port located between said inlet ports in communication with an environment at a second pressure, transfer means within the housing for transferring material introduced at the inlet ports to the outlet port of the housing including at least two chambers and reciprocating within the housing so as to alternately align one chamber with an inlet port while the other is simultaneously aligned with the outlet port, to thereby enable material to be loaded into one chamber while material is simultaneously discharged from the other chamber, and means surrounding said at least two chambers for preventing direct communication of said environments through said inlet and outlet ports.

Further scope of applicability of the present invention will become apparent from the detailed description given hereinbelow. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

FIGS. 2a and 2b illustrate cross-sectional views of the air lock spool and air lock housing of FIGS. 1a and 1b respectively;

FIG. 2c illustrates a cross-sectional view of an alternative embodiment of the air lock housing in which a pressure equalization line is used;

DETAILED DESCRIPTION OF THE PREFERRED EMBODIMENTS

Figure 1A:
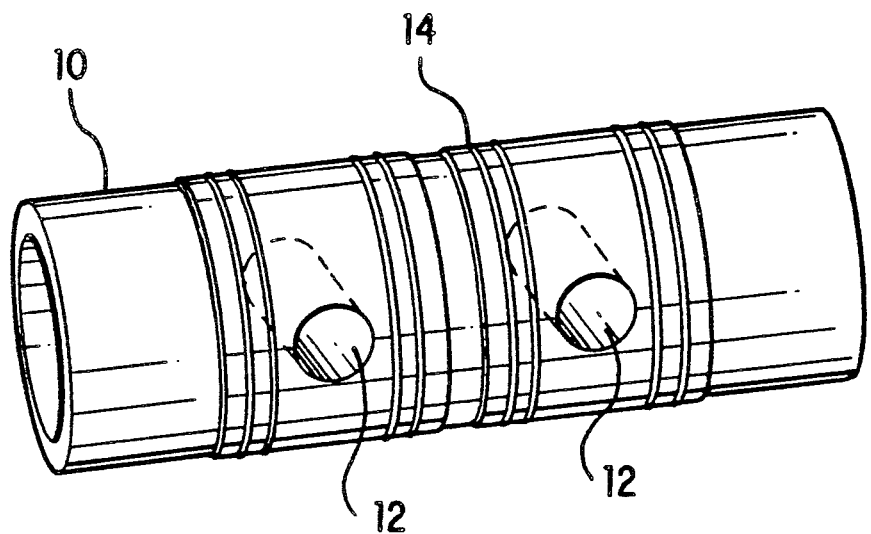
FIGS. 1a and 1b illustrate a perspective view of one embodiment of an air lock spool and an air lock housing respectively.
Figure 1B:
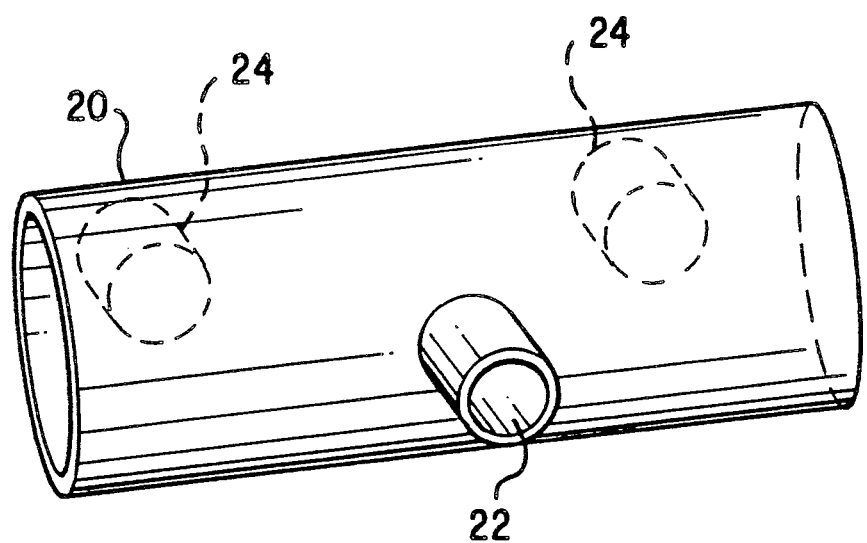
Figure 5:
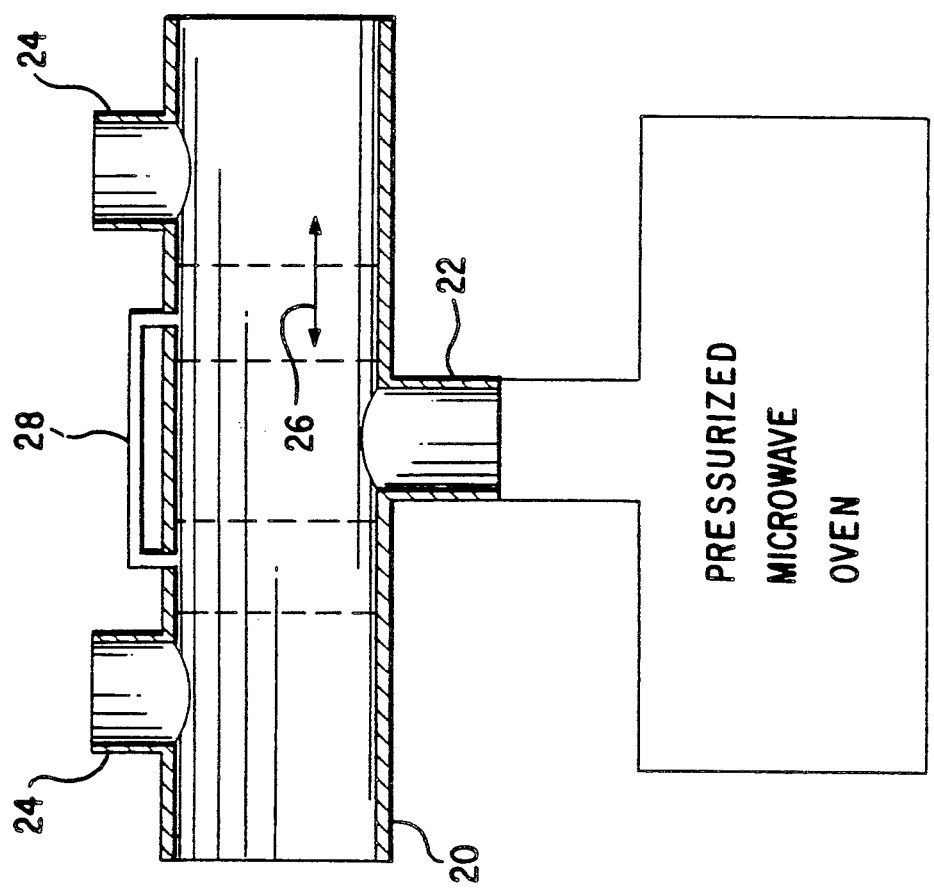
FIG. 5 is a cross sectional view illustrating the discharge of the air lock outlet port into a pressurized microwave oven.

FIGS. 1a and 1b respectively illustrate one embodiment of an air lock spool and an air lock housing according to the present invention. Reference numeral 10 illustrates a cylindrical spool containing two chambers 12 into which substances such as food solids or liquids are loaded and discharged. The spool 10 fits within a cylindrical housing 20 having a discharge/inlet port 22 located between first and second inlet/outlet ports 24. The configuration of the airlock is such that an inlet airlock transfers product from atmospheric to pressurized or vacuum conditions while a discharge airlock transfers product from pressurized or vacuum conditions to atmospheric conditions. When used as an inlet airlock, ports 24 serve as inlet ports while port 22 functions to discharge product into a chamber. When used as a discharge airlock, port 22 receives processed products for discharge to atmospheric conditions via ports 24. While the housing and spool are illustrated as being cylindrical or round, the shape of the spool and housing is not limited thereto but may be any other suitable shape according to the present invention. In addition, while the chambers 12 and ports 22, 24 are illustrated as being cylindrical, they may equivalently be of another geometrical configuration such as rectangular, especially when used in conjunction with a pressurized microwave oven, as illustrated in FIG. 5.

Figure 6:
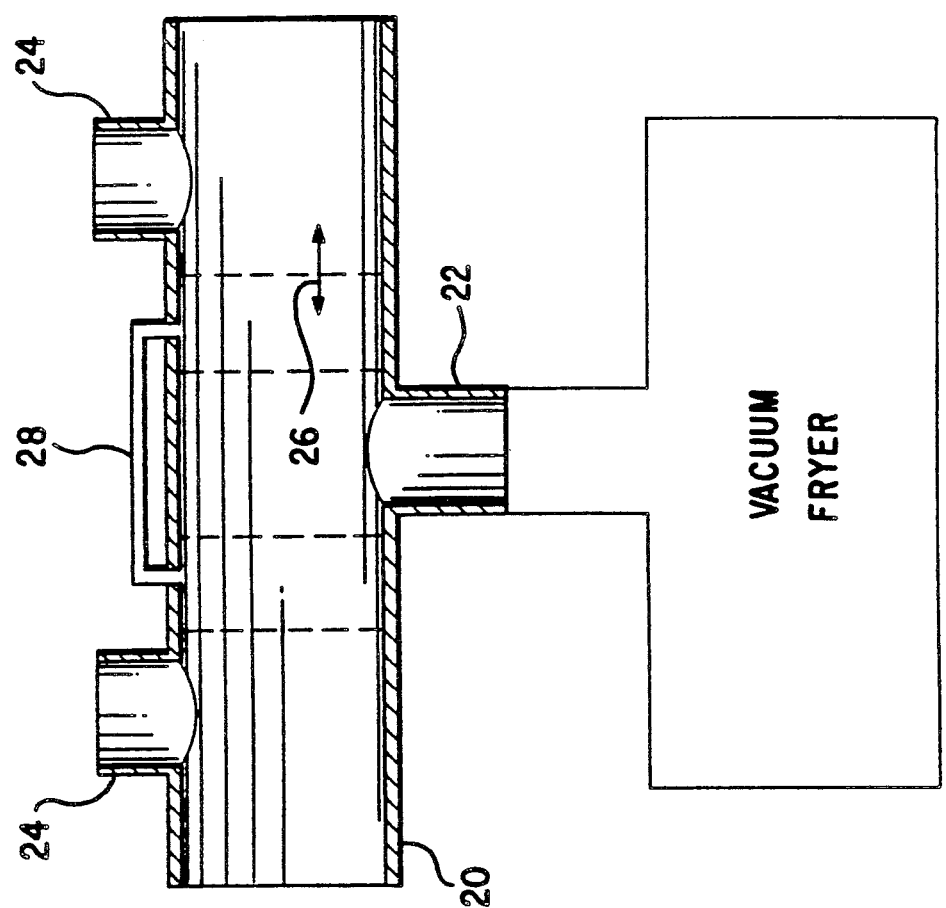
FIG. 6 is a cross sectional view illustrating the discharge of the air lock outlet port into a vacuum fryer.

As shown in FIG. 6, the airlock of the present invention also can be used to discharge into a vacuum fryer.

Surrounding each chamber 12 on either side thereof is a pair of O-ring seals 14 which maintains the pressure differential between the inlet and outlet ports as the spool reciprocates within the housing. Seals 14 can be implemented by any other equivalent type of seal, including quad-ring seals and single or double lip seals. It is to be noted that while the inlet ports 24 generally are in communication with environments at the same pressure, the apparatus is not limited to such use and each inlet port 24 may be in communication with an environment having a pressure different from the other inlet port and also different from the pressure of the environment communicating with the outlet port 22.

Figure 2A:
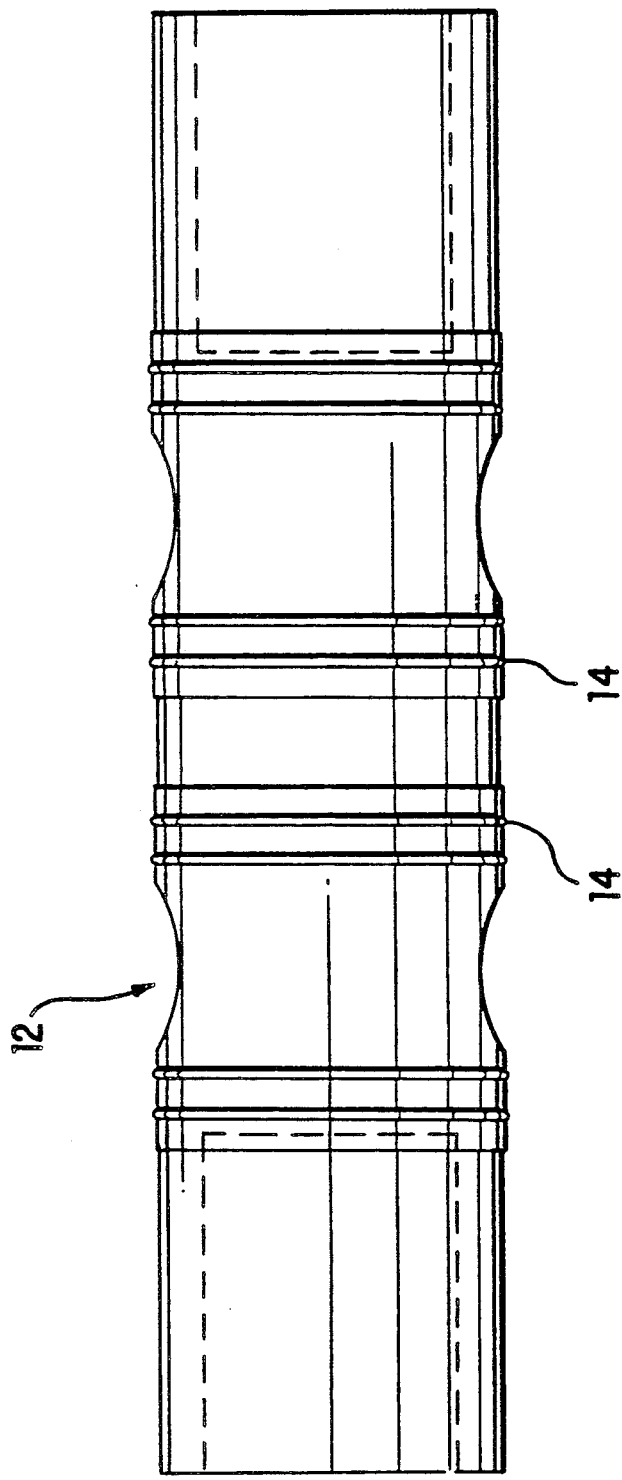

FIG. 2a is a cross-sectional view of the spool illustrated in FIG. 1a in which the detailed configuration of the double O-ring seals 14 is illustrated. FIG. 2b is a cross-sectional view of the housing of FIG. 1b and illustrates the reciprocal spool travel direction within the housing indicated by double arrow 26.

Each product chamber 12 is formed within the spool to have a dimension the same size as that of the inlet and outlet ports 22 and 24 of the spool housing 20. The distance between the center lines of the product chambers is equal to the distance between the center line of the outlet port 22 and the center line of either inlet port 24 as illustrated in the figures. The O-rings 14 are located within O-ring grooves machined into the spool on each side of the product chambers 12. Each of the O-rings is designed to withstand an operating pressure differential up to a maximum of 125 psi or 8.79 kg/cm$^2$.

FIG. 2c is a cross-sectional view of an alternative embodiment of the air lock housing in which a pressure equalization line 28 is provided between two positions on the housing The positions at which the line is attached correspond to the positions of the first and second product chambers when neither is in communication with an inlet or discharge port.

With the addition of equalization line 28, the chamber environments will be balanced with each other when both chambers are isolated from the inlet and discharge ports to minimize the pressure differential before the chamber is fully exposed to minimize damage to a product being transported and also will minimize loss of gas when a pressurized gas is utilized in one environment.

Figure 3A:
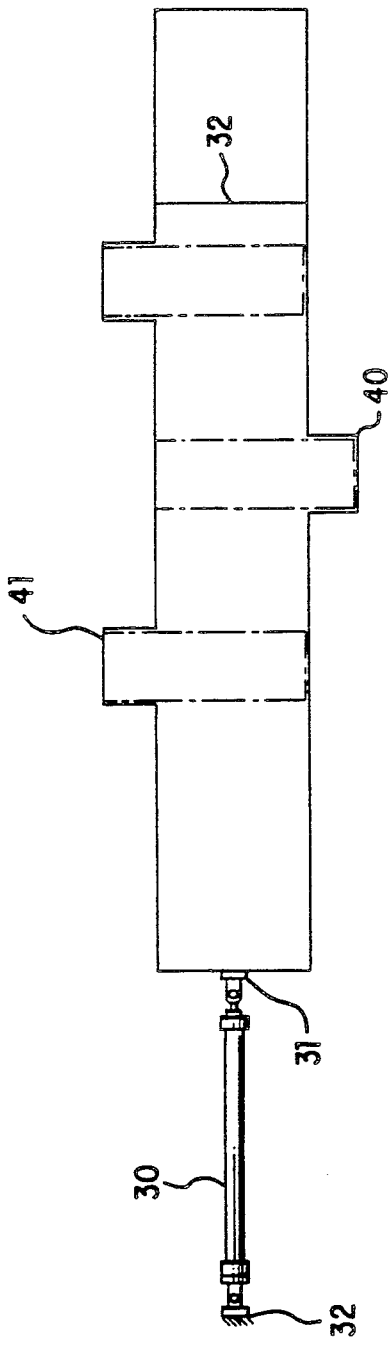
FIGS. 3a and 3b illustrate the operation of the air lock transfer device between inlet and outlet ports.
Figure 3B:
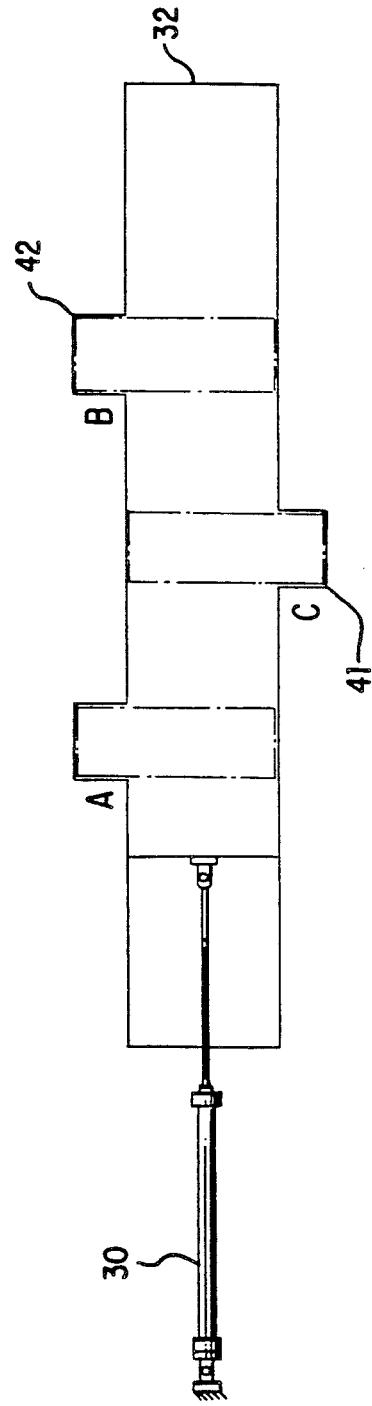

FIGS. 3a and 3b illustrate the reciprocating motion of the spool within the housing so as to allow simultaneous product loading and unloading at the inlet and outlet ports respectively. The reciprocal motion of the spool within the housing is controlled by an air cylinder 30 which is attached to the spool at one end 31 and which is attached to a stationary point at another end 32 as illustrated in FIG. 3a. The other end of the spool is coupled to an alignment apparatus (not shown) to maintain accurate alignment of the spool within the housing as the spool reciprocates between inlet and discharge ports. FIG. 3a illustrates a product 41 being loaded into one chamber of the spool while a previously loaded product 40 is simultaneously discharged from the other chamber at the outlet port of the housing. As shown in FIG. 3b, as the air cylinder 30 reciprocates the spool to the other end of the housing, the product 41 can be discharged at the outlet port while another product 42 is simultaneously loaded into the product chamber rendered empty by the previous discharging of product 40 located therein.

FIGS. 4a–4h illustrate one-half cycle of the spool motion within the housing to explain the operation of the air lock mechanism. The O-ring seals are designed so that there always exist at least two O-rings in contact with the housing between each of the ports A and B and the port C.

Figure 4D:
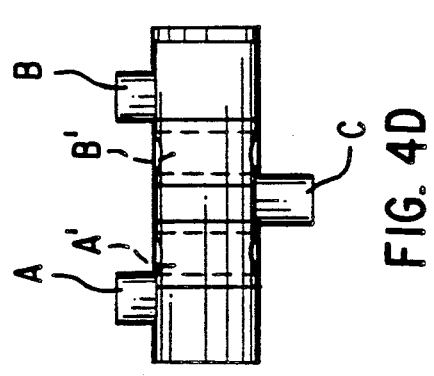
FIGS. 4a–4h illustrate the motion of the air lock spool incrementally over one-half cycle within the housing.
Figure 4H:
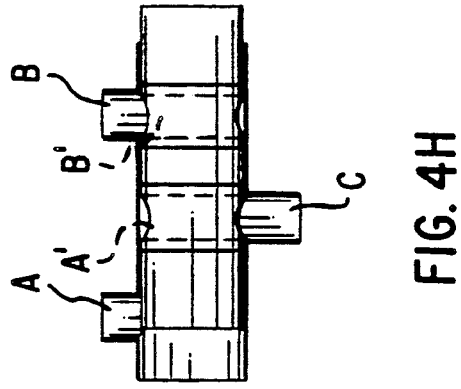
Figure 4C:
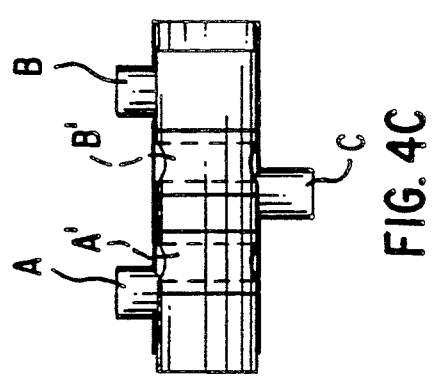
Figure 4G:
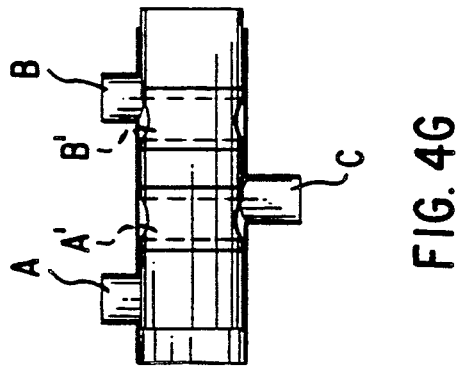
Figure 4B:
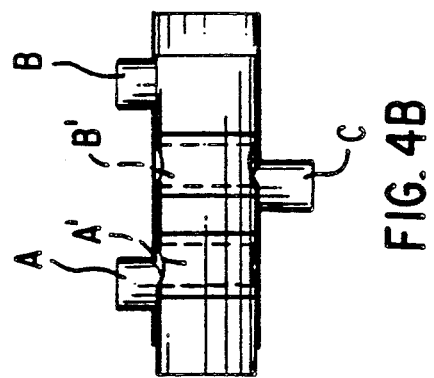
Figure 4F:
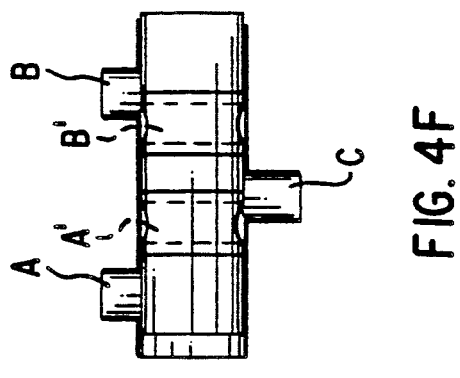
Figure 4A:
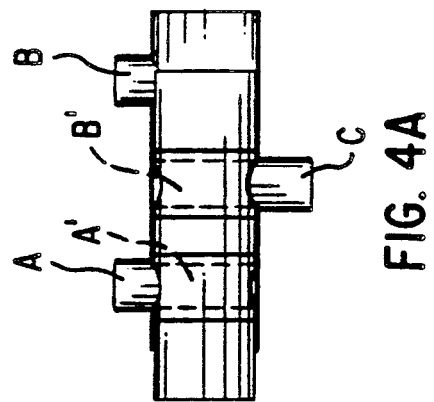
Figure 4E:
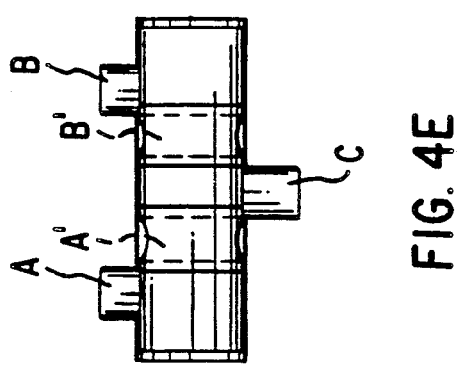

As shown in FIG. 4a, the product chamber A' is aligned with inlet port A while product chamber B, is aligned with the outlet port C. FIG. 4b illustrates a first incremental motion of the spool so that the two O-rings to the right of chamber A' seal the pressure differential between ports A and C while the two O-rings to the right of chamber B, seal the pressure differential between ports B and C. FIGS. 4c and 4d illustrate further incremental movements of the spool toward the inlet port B and serve to illustrate that the product within the chamber A' is moved along the housing channel within the spool at the same pressure conditions existing at inlet port A. FIG. 4e illustrates the first position at which chamber A' is totally sealed from the pressures at ports A and C. In this position, the innermost O-rings on either side of chambers A' and B' seal the pressure differential between ports A and C, and ports B and C.

FIG. 4f illustrates the first location in which the chamber A' is equalized with the pressure conditions existing at outlet port C. In this position, the two 0-rings to the left of chamber A' seal the differential between ports A and C, while the two O-rings to the left of chamber B' seal the pressure differential between ports B and C. At the position illustrated in FIG. 4g, the product loaded into the chamber A' begins to discharge through the outlet port C by gravitational forces. FIG. 4h illustrates the final extended position of the spool in which the pressure differential between ports A and C is sealed by the O-rings to the left of chamber A', while the pressure differential between ports B and C is sealed by the two O-rings to the right of chamber A' as well as the two O-rings to the left of chamber B'.

The other half cycle of spool motion is the reverse of the first half cycle in which the air cylinder retracts from the fully extended position shown in FIG. 3b to the fully closed position shown in FIG. 3a.

It is further to be noted that the air lock spool and housing may be fabricated of any suitable material such as stainless steel or PVC according to the specific temperature and pressure conditions under which the apparatus is to operate.

The invention being thus described, it will be obvious that the same may be varied in many ways. Such variations are not to be regarded as a departure from the spirit and scope of the invention, all such modifications as would be obvious to one skilled in the art being intended to be included within the scope of the following claims.

We claim:

1. Apparatus for transferring material between two different pressure environments, comprising:
    an elongated housing having at least two inlet ports spaced apart from each other in communication with an environment at one pressure, and at least one outlet port located between said inlet ports in communication with an environment at a second pressure;
    transfer means within said housing for transferring material introduced at said inlet ports to said outlet port including at least two chambers and reciprocating within said housing so as to alternately align one chamber with an inlet port while the other is simultaneously aligned with said outlet port, thereby enabling material to be loaded into one chamber while material is simultaneously discharged from the other chamber;

means surrounding said at least two chambers for preventing direct communication of said differing pressure environments through said inlet and outlet ports; and pressure equalization means positioned on said housing for balancing the pressure between said at least two chambers while said chambers are at a location within said housing where said chambers are isolated from said inlet and outlet ports.

2. Apparatus as recited in claim 1, wherein said preventing means comprises a plurality of O-ring seals located on either side of each said chamber on said transfer means.

3. Apparatus as recited in claim 1, wherein said outlet port communicates with a pressure higher than that communicating with said inlet ports.

4. Apparatus as recited in claim 1, wherein said outlet port communicates with a pressure lower than that communicating with said inlet ports.

5. Apparatus as recited in claim 1, wherein said at least two chambers are cylindrical in shape.

6. Apparatus as recited in claim 1, wherein said at least two chambers are rectangular in shape.

7. Apparatus as recited in claim 1, wherein said material comprises a food substance, and said outlet port discharges into a vacuum fryer.

8. Apparatus as recited in claim 1, wherein said material comprises a food substance, and said outlet port discharges into a pressurized microwave oven chamber.

* * * * *